(12) United States Patent
Hertaus et al.

(10) Patent No.: US 10,675,744 B2
(45) Date of Patent: Jun. 9, 2020

(54) MULTI-PURPOSE HANDHELD TOOL

(71) Applicant: Nifty Home Products Inc., Madison Lake, MN (US)

(72) Inventors: Todd Hertaus, New Market, MN (US); Nicholas Teigland, Mankato, MN (US)

(73) Assignee: Nifty Home Products Inc., Madison Lake, MN (US)

( * ) Notice: Subject to any disclaimer, the term of this patent is extended or adjusted under 35 U.S.C. 154(b) by 0 days.

(21) Appl. No.: 15/965,052

(22) Filed: Apr. 27, 2018

(65) Prior Publication Data

US 2018/0311803 A1 Nov. 1, 2018

Related U.S. Application Data

(60) Provisional application No. 62/492,564, filed on May 1, 2017.

(51) Int. Cl.
| | |
|---|---|
| *B25F 1/00* | (2006.01) |
| *B25F 1/04* | (2006.01) |
| *B25B 13/48* | (2006.01) |
| *B23D 51/10* | (2006.01) |
| *A62B 3/00* | (2006.01) |
| *B23D 49/10* | (2006.01) |
| *B27B 21/04* | (2006.01) |
| *B25B 13/56* | (2006.01) |

(52) U.S. Cl.
CPC .............. *B25F 1/006* (2013.01); *A62B 3/005* (2013.01); *B23D 49/10* (2013.01); *B23D 51/10* (2013.01); *B25B 13/48* (2013.01); *B25B 13/56* (2013.01); *B25F 1/04* (2013.01); *B27B 21/04* (2013.01)

(58) Field of Classification Search
CPC .... B25F 1/00; B25F 1/006; B25F 1/04; B26B 1/02
USPC .......................................................... 30/341
See application file for complete search history.

(56) References Cited

U.S. PATENT DOCUMENTS

| | | | | |
|---|---|---|---|---|
| 822,066 | A * | 5/1906 | Morkert | B25B 7/22 254/26 R |
| 2,576,869 | A * | 11/1951 | Woltemath | A01B 1/022 134/169 R |
| 4,730,394 | A * | 3/1988 | Sonner, Jr. | B26B 1/048 30/155 |
| 4,918,820 | A * | 4/1990 | Korb | B23D 51/01 30/155 |
| D411,429 | S * | 6/1999 | Gringer | D8/95 |
| 7,036,952 | B2 * | 5/2006 | Zirk | B26B 1/04 30/308.1 |

(Continued)

*Primary Examiner* — Jennifer B Swinney
(74) *Attorney, Agent, or Firm* — Michael A. Bondi; Moss & Barnett

(57) ABSTRACT

A multi-purpose handheld tool including a handle, a hatchet head portion, a saw blade and a saw blade control mechanism. The handle has a first end and a second end. The handle has a slot formed therein. The hatchet head portion is operatively coupled to the first end of the handle. The saw blade is pivotally coupled to the handle. The saw blade control mechanism pivots the saw blade between a storage configuration and a use configuration. The saw blade control mechanism includes a saw control handle and a saw control hub. The saw control handle has a gripping extension extending therefrom. The gripping extension indicates a direction of the saw blade with respect to the handle. The saw control hub engages the saw blade.

14 Claims, 4 Drawing Sheets

(56) References Cited

U.S. PATENT DOCUMENTS

| | | | | |
|---|---|---|---|---|
| 7,093,367 | B1* | 8/2006 | Huang | B23D 51/01 |
| | | | | 30/161 |
| 7,231,718 | B2* | 6/2007 | Outen | B26B 1/046 |
| | | | | 30/155 |
| 7,934,441 | B1* | 5/2011 | Hyde | B25B 13/463 |
| | | | | 7/143 |
| 9,289,650 | B2* | 3/2016 | Willey | A63B 29/08 |
| 2016/0067803 | A1* | 3/2016 | Kohl | B26B 1/044 |
| | | | | 30/161 |
| 2016/0354909 | A1 | 12/2016 | Weinberger | |

\* cited by examiner

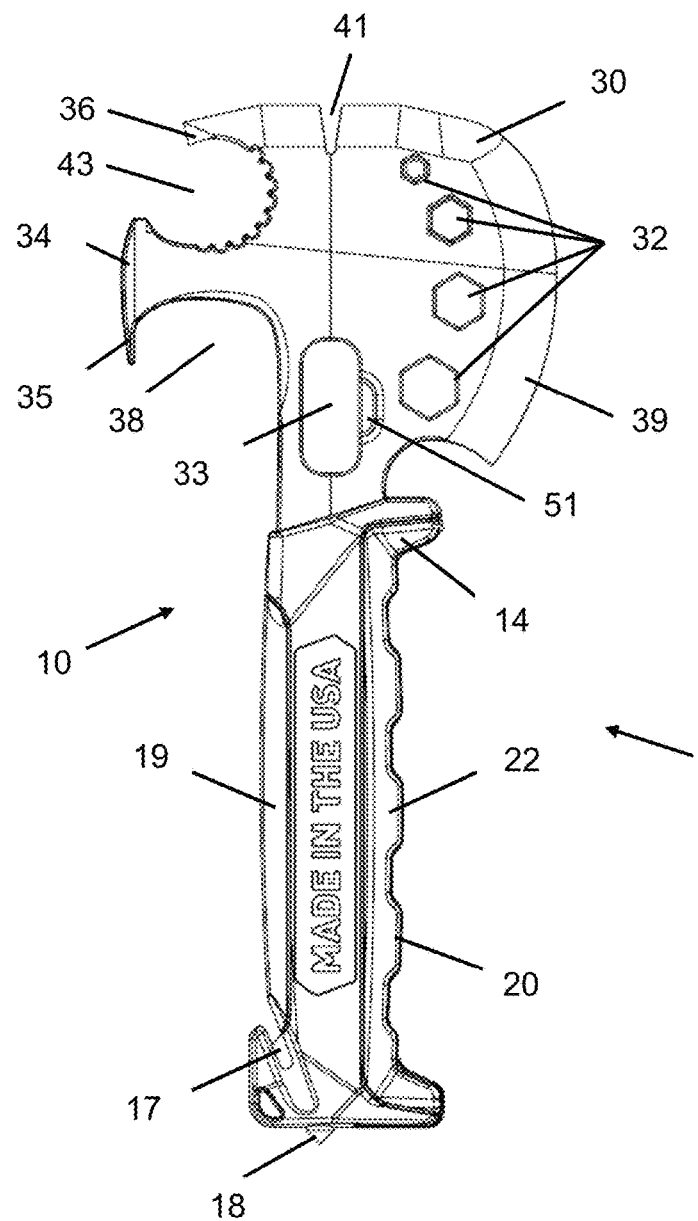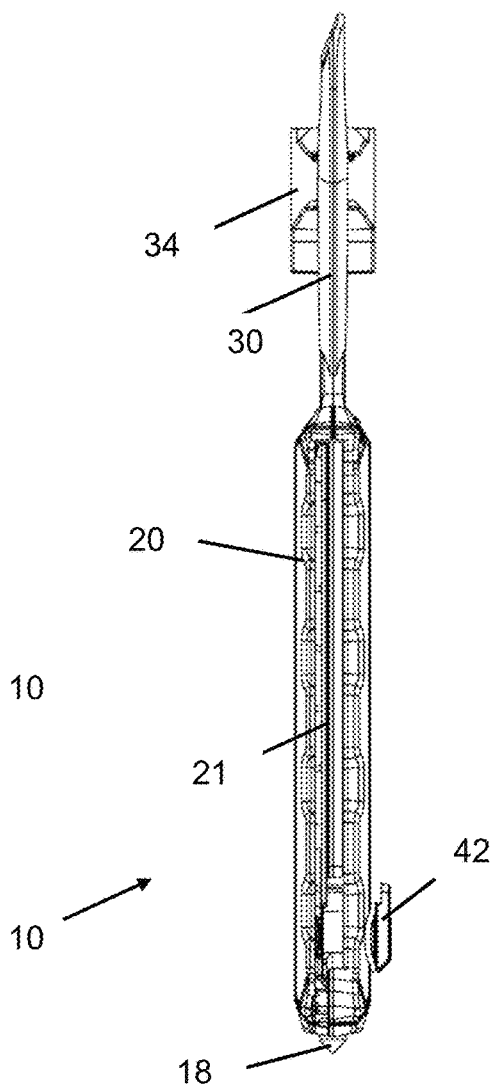
Fig. 3
Fig. 4

MULTI-PURPOSE HANDHELD TOOL

REFERENCE TO RELATED APPLICATION

This application claims priority to Provisional Applic. No. 62/492,564, filed on May 1, 2017, the contents of which are incorporated herein by reference.

FIELD OF THE INVENTION

The present disclosure generally relates to the technical field of multi-purpose tools. More specifically, the present disclosure is directed to a multi-purpose handheld tool with saw.

BACKGROUND OF THE INVENTION

Traditional multi-purpose handheld tools are limited in design and utility for the various operations and unique challenges that rescue workers and emergency response personnel may encounter. In addition, current multi-purpose tools are of limited effectiveness to the challenges presented in an emergency environment. Rescue workers are constantly searching for simple, inexpensive, multiple application devices that require less space that are highly mobile for use in a variety of emergency situations.

Many handheld tools are designed absent a coordinated purpose aimed at addressing a variety of emergency applications. Specifically, handheld tools may either be too compact to be utilized for complex rugged applications or too bulky to be appropriate for rescue personnel. In contrast, many individual tools provide a robust durable device for complex emergency situations, but have limited utility for multiple applications. Thus, these tools require personnel to carry multiple different tools to be limiting the effectiveness and efficiency for rescue operations.

Multi-purpose handheld prior art tools do not meet the current needs of rescue workers. In addition, these tools are of limited utility to non-rescue workers, whether due to their cost, size, and/or specialized feature set.

Weinberger et al., U.S. Patent Publication No. 2016/0354909, describes a multi-purpose handheld tool having a handle with a multi-function head at one end thereof. A saw blade is pivotally attached to the head for movement between a storage configuration and a use configuration. A lock mechanism maintains the saw blade in the storage configuration or the use configuration. When the lock mechanism is disengaged, the saw blade is moveable between the storage configuration and the use configuration. The contents of which are incorporated by reference.

SUMMARY OF THE INVENTION

An embodiment of the invention is directed to a multi-purpose handheld tool including a handle, a hatchet head portion, a saw blade and a saw blade control mechanism. The handle has a first end and a second end. The handle has a slot formed therein. A hatchet head portion is operatively coupled to the first end of the handle. The saw blade is pivotally coupled to the handle. The saw blade control mechanism pivots the saw blade between a storage configuration and a use configuration. The saw blade control mechanism includes a saw control handle and a saw control hub. The saw control handle has a gripping extension extending therefrom. The gripping extension indicates a direction of the saw blade with respect to the handle. The saw control hub engages the saw blade.

Another embodiment of the invention is directed to a method of fabricating a multi-purpose handheld tool. A handle is provided that has a first end and a second end. A slot is formed in the handle. A hatchet head portion is operably attached to the first end of the handle. A saw blade is pivotally attaching to the handle with a saw blade control mechanism for movement between a use configuration and a storage configuration. The saw blade control mechanism includes a saw control handle and a saw control hub. The saw control handle has a gripping extension extending therefrom that indicates a direction of the saw blade with respect to the handle. The saw control hub engages the saw blade.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 3 is a second side view of the multi-purpose handheld tool of FIG. 1 with the saw blade in the storage configuration.

FIG. 4 is a back side view of the multi-purpose handheld tool of FIG. 1 with the saw blade in a use configuration.

DETAILED DESCRIPTION OF THE INVENTION

Figures 1, 2:
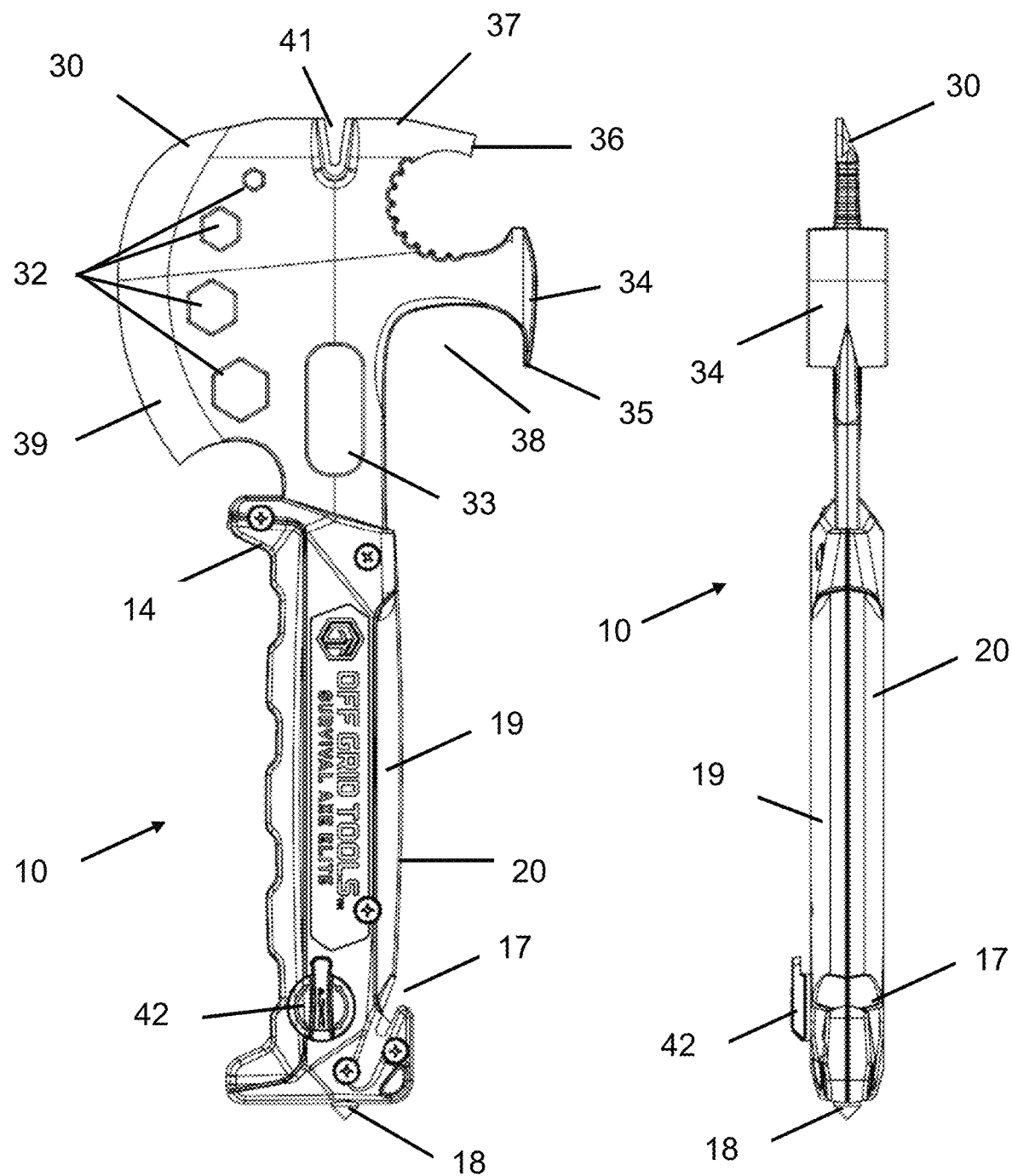
FIG. 1 is a first side view of a multi-purpose handheld tool with a saw blade in a storage configuration.
FIG. 2 is a front side view of the multi-purpose handheld tool of FIG. 1 with the saw blade in the storage configuration.
Figure 5:
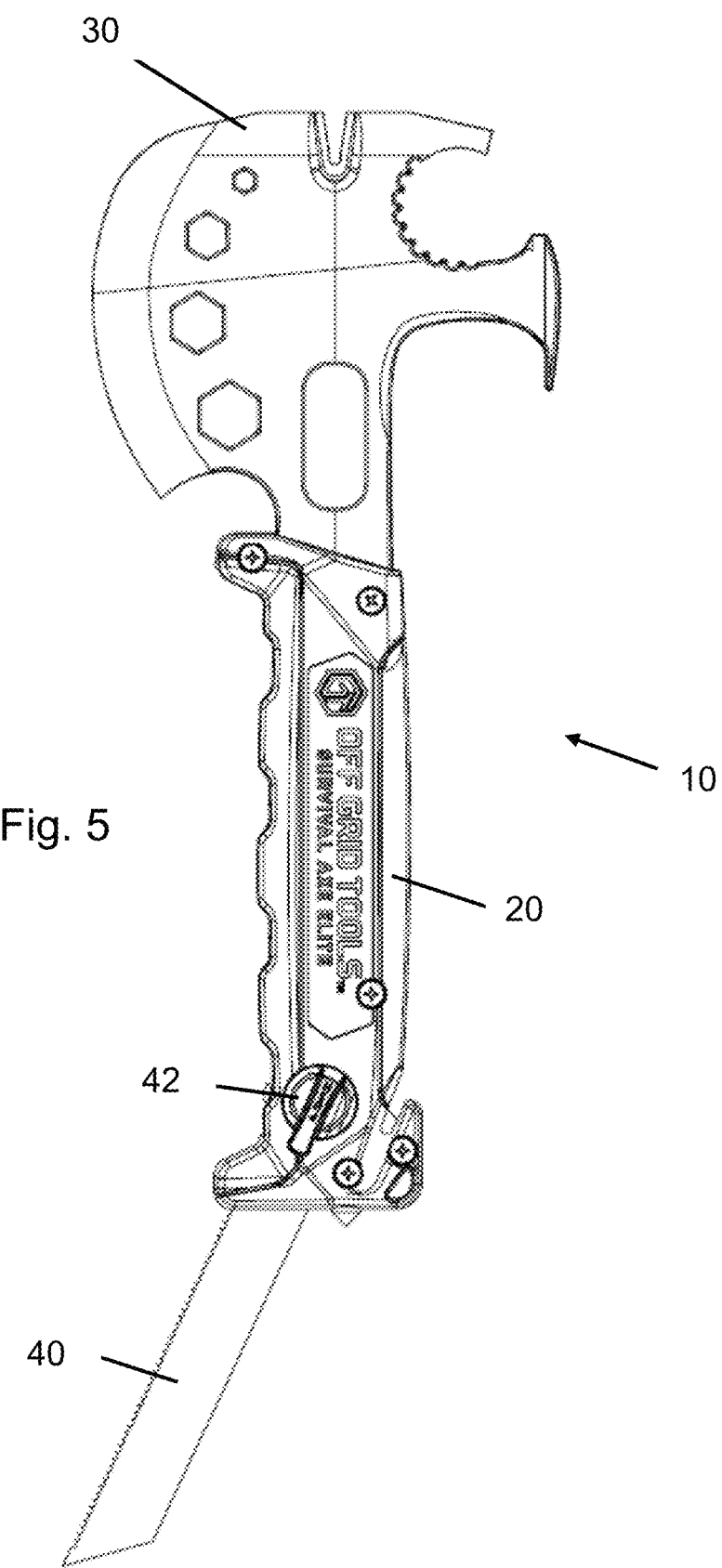
FIG. 5 is a first side view of the multi-purpose handheld tool of FIG. 1 with the saw blade in an extended position.

An embodiment of the invention is directed to an apparatus for use as a rescue multi-purpose handheld tool with a retractable saw blade. The multi-purpose handheld tool permits the user to perform a variety of tasks without the need to rely on several different tools.

According to various embodiments in the figures, and particular to FIGS. 1-5, an embodiment of a multi-purpose handheld tool 10 is illustrated. The multi-purpose handheld tool 10 includes a handle 20 operatively coupled to a hatchet head portion 30 at a first end of the handle 20 and a saw blade 40 pivotally coupled at a second end of handle 20 opposing the hatchet head portion 30.

The handle 20 may be fabricated from a variety of materials, examples of which include metal, high strength plastic, or any suitably rigid and strong material. In certain embodiments, the handle 20 may be made of metal harder than aluminum with corrosion resistant properties.

A cutting blade 17 is operatively mounted to the second end of the handle 20 such that the cutting blade 17 is at least partially recessed in the handle 20. The cutting blade 17 is coupled to the handle 20 and configured to cut a belt/strap inserted into the recess. The cutting blade 17 may be formed from two or more portions of the handle 20. In various embodiments, the cutting blade 17 may be formed by inserting a means for cutting a belt/strap by disposing a blade into a unitary or monolithic handle 20.

The cutting blade 17 may be configured to be replaceable within the handle 20. In certain embodiments, the cutting blade 17 may be a snap-off blade comprising different segments, for example, BR-033751D by American Cutting Edge of Centerville, Ohio. In some embodiments, replacement blade segments of the recessed cutting blade 17 may be stored in the handle of the tool.

The hatchet head portion 30 is operatively coupled to the handle 20. The hatchet head portion 30 may have two diametrically opposed sides or faces. The hatchet head portion 30 may be made of metal, or any substantially rigid strong material. In certain embodiments, the hatchet head portion 30 may be made of a metal with corrosion resistant properties. The handle 20 and the hatchet head portion 30 can also be formed as a unitary or monolithic structure from a single piece of material. One of ordinary skill in the art, however, will appreciate that the handle 20 and the hatchet head portion 30 may be joined using a variety of techniques such as fusing, welding, or other suitable means of connecting two individual pieces.

The hatchet head portion 30 has a hatchet blade 39 that is configured to form a blade edge from the converging end of the diametrically opposed sides or faces. In various embodiments, the blade edge of hatchet blade 39 is formed by converging tapered portions of the diametrically opposed sides or faces. In some embodiments, the hatchet blade 39 is substantially curvilinear or rounded in shape.

The hatchet head portion 30 may have a hammer head 34 and a hammer claw 35 operatively coupled thereto with an elongated neck that extends outward from the side opposite hatchet blade 39. The elongated neck coupling hammer head 34 and the hatchet head portion 30 is of sufficient length to provide a spanner wrench socket 38 disposed between the nail puller 41 and the hatchet head portion 30. The nail puller 41 can also be used for twisting wires. In some embodiments, the hammer head 34 has an overhang configured to catch a hose coupling to serve as a spanner wrench socket 38.

The hatchet head portion 30 may have a plurality of openings to accommodate various utility applications such as a plurality of hex wrench openings 32 that are formed with different sizes. In some embodiments, a gas valve wrench opening 33 is operatively disposed in the hatchet head portion 30 and configured to maintain engagement and operate a gas valve. In various embodiments, the gas valve wrench opening 33 has a hemispherical opening 51 to accommodate different types of gas valves. In various embodiments, the hatchet head portion 30 comprises an opening or indentation configured to be a bottle opener.

In some embodiments, a hook 36 is operatively coupled to the hatchet head portion 30 and extends into a space between the hammer head 34 and the hatchet head portion 30. The hook 36 is configured to provide a capture device for securing or maintaining engagement of the multipurpose handheld tool 10. In some embodiments, a wedge or pry 37 is formed at the top of the hatchet head portion 30 opposite the end of the operatively coupled handle 20.

A can opener may be formed from the hook 36 and the hammer head 34. In various embodiments, a hemispherical space 43 is formed between the hook 36 and the hammer head 34 to provide a means for gripping or hooking objects. In some embodiments, the hemispherical space 43 has a plurality of teeth or gears to assist in gripping or hooking objects.

The saw blade 40 is pivotally attached to the handle 20. The saw blade 40 may be any saw blade suitable to fit in a reciprocating saw that has an interchangeable saw blade feature. In various embodiments, saw blade 40 may be the following reciprocating saw blade: Milwaukee 48-00-5182 Super SAWZALL® Blade 14 Teeth per Inch 6-Inch Length available from Milwaukee Electric Tool of Brookfield, Wis.

In some embodiments, the saw blade 40 may be removed or interchangeable with a replacement saw blade. In various embodiments, saw blade 40 is pivotally coupled and configured to be permanently attached to handle 20. One of ordinary skill in the art will understand that a saw blade 40 made be formed with a plurality of teeth and vary in length and constructed material. In certain embodiments, saw blade 40 is configured to be at least partially received within slot or cavity 21 in handle 20.

Figures 6, 7:
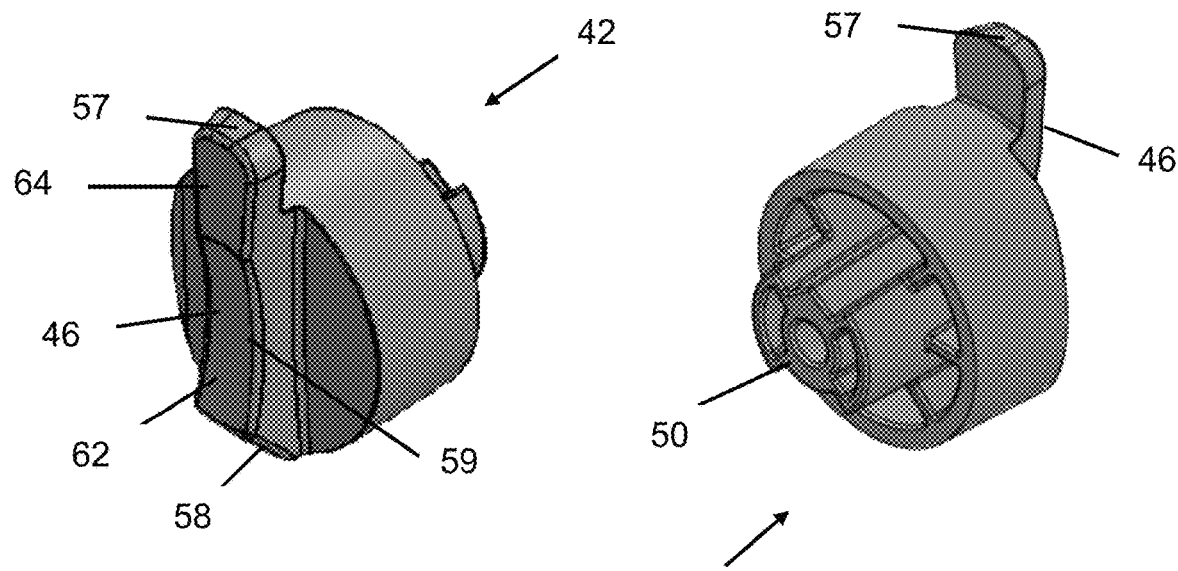
FIG. 6 is a top perspective view of a blade control knob for the multi-purpose handheld tool.
FIG. 7 is a bottom perspective view of the blade control knob.

The saw blade 40 is operably attached to the handle 20 using a control mechanism that includes a saw control handle 42 and a saw control hub 44. The saw control handle 42 has a generally cylindrical shape as illustrated in FIGS. 6 and 7. An upper surface of the saw control handle 42 includes a gripping extension 46 extending therefrom.

At least a portion of the saw control handle 42 and the saw control hub 44 are recessed below with an outer surface of the multi-purpose handheld tool 10, as illustrated in FIGS. 2 and 4, which illustrate that only an upper part of the saw control handle 42 extends above the surface of the multi-purpose handheld tool 10. In certain embodiments, only the gripping extension 46 extends above the surface of the multi-purpose handheld tool 10.

The gripping extension 46 is used to grasp the saw control handle 42 when moving the saw blade 40 from the storage configuration to the use configuration. On the other hand, the gripping extension 46 does not extend too far from the upper surface of the saw control handle 42 to minimize the potential of the saw control handle 42 being inadvertently contacted to unintentionally move the saw blade 40 from the storage configuration to the use configuration.

Using this configuration facilitates a person firmly grasping the multi-purpose handheld tool 10 in either a right hand or a left hand, without interference from the saw control handle 42 especially with persons who have a larger than normal hand size.

The gripping extension 46 may have an elongated shape with opposite side surfaces that are generally parallel to each other. The gripping extension 46 may extend substantially between opposite sides of the saw control handle 42.

The gripping extension 46 includes a first gripping end 57 and a second gripping end 58 at opposite ends thereof. In certain embodiment, the first gripping end 57 extends beyond a side of the saw control handle 42. At least a portion of an end surface of the edge that extends beyond the end of the saw control handle 42 may be curved.

In certain embodiments, the second gripping end 58 may not extend beyond the saw control handle 42. The second gripping end 58 may be oriented at an obtuse angle with respect to a side wall of the saw control handle 42.

Forming the first gripping end 57 and the second gripping end 58 with different shapes and lengths facilitates a person using the multi-purpose handheld tool 10 identifying the orientation of the saw control handle 42 using his/her fingers with looking at the saw control handle 42.

Intermediate the first gripping end 57 and the second gripping end 58, an upper surface 59 of the gripping extension 46 may have a convex shape. The convex shape of the upper surface 59 facilitates a person using the multi-purpose handheld tool 10 to accurately position his/her fingers with respect to the saw control handle 42 without the person looking at the saw control handle 42.

In other embodiments, the upper surface 59 of the gripping extension 46 includes two sections 62, 64. The first section 62 is located above the saw control handle 42 and at least a portion of the second section 64 is in the part of the gripping extension 46 that extends beyond the saw control handle 42. The first section 62 may have a convex shape.

The shape of the saw control handle 42 and the gripping extension 46 thereby facilitates a person using the saw control handle 42 to operate the saw control handle 42 based upon feeling the saw control handle 42 and is not required to look at the saw control handle 42 during such operation.

Additionally, the shape of the saw control handle 42 also facilitates a user identifying an orientation of the saw blade 40 with the user viewing the multi-purpose handheld tool 10. In particular, the user can feel the orientation of the saw blade 40 by identifying the position of the end of the saw control handle 42 that extends over the outer cover of the multi-purpose handheld tool 10, such as when the two of the user's fingers are placed on opposite sides of the gripping extension 46.

The gripping extension 46 may be oriented in a direction that is generally aligned with the direction of the saw blade 40. Using such a configuration, provides further visual and tactile ability for the person using the multi-purpose handheld tool 10 to identify whether the saw blade 40 is in an extended position or a retracted position.

When the multi-purpose handheld tool 10 is grasped on the handle 20 and used as a hammer or a hatchet, the shape of the handle 20 causes the person's hand to be positioned proximate the proximal end of the handle 20. When the person's hand is in this position, the person's little finger extends around the handle 20 proximate to the saw control handle 42.

The person can thereby evaluate the position of the saw blade 20 by contacting the surface of the gripping extension 46 with the person's little finger to confirm that the saw blade 40 is in the closed configuration without looking at the multi-purpose handheld tool 10 because, there are potential dangers associated with swinging of the multi-purpose handheld tool 10 when the saw blade 40 is not in the storage configuration.

A mating extension 50 extends from a lower surface of the saw control handle 42. The mating extension 50 has a non-symmetrical shape. The mating extension 50 is capable of extending into a mating recess 52 in the saw control hub 44. At least a portion of an inner surface of the mating recess 52 has a shape that is similar to the outer surface of the mating extension 50. In other embodiments, the inner surface of the mating recess 52 is shaped substantially the same as the outer surface of the mating extension 50. Using this configuration, facilitates rotation of the saw control hub 44, when the saw control handle 42 is rotated.

Figures 8, 9:
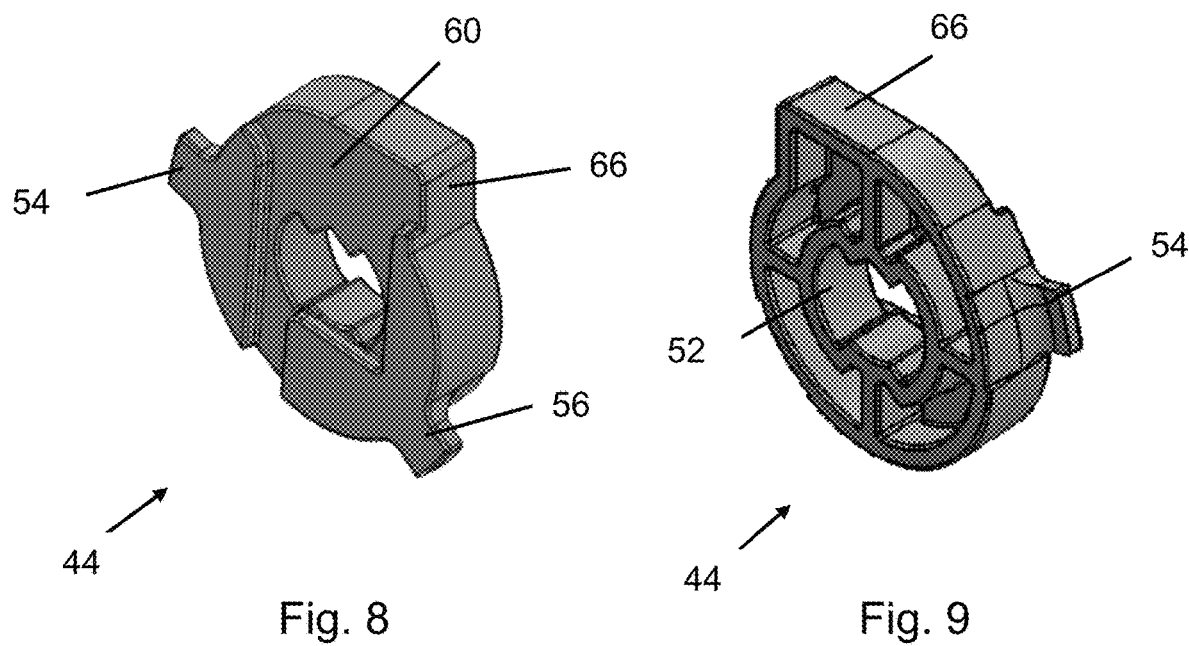
FIG. 8 is a top perspective view of a blade control hub for the multi-purpose handheld tool.
FIG. 9 is a bottom perspective view of the blade control hub.

The saw control hub 44 has an outer surface that is similar to the shape of the outer surface of the saw control handle 42 as illustrated in FIGS. 8 and 9. The saw control hub 44 has a first radial extension 54 and a second radial extension 56 extending therefrom. The first and second radial extensions 54, 56 are oriented at an angle with respect to each other.

This angle limits the range of motion of the saw blade 40 when moving between the storage configuration and the use configuration. When the saw control hub 44 reaches an end of a range of motion, the first or second radial extension 54, 56 contacts a surface on the handle 20 and such contact prevents the saw blade 40 from turning further.

In certain embodiments, the angle between the first radial extension 54 and the second radial extension 56 is between about 90 degrees and about 180 degrees. In other embodiments, the angle between the first radial extension 54 and the second radial extension 56 is about 120 degrees.

Alternatively or additionally, the saw control hub 44 or the saw control handle 42 may have an outer shape that limits a range of motion over which the saw blade 40 is pivotal. For example, the saw control hub 44 may have a non-circular section 66 that engages a surface inside of the multi-purpose handheld tool 10 as the saw blade 40 is rotated.

An upper surface of the saw control hub 44 has a recess 60 formed therein. This recess 60 is shaped similar to the shank of the saw blade 40. When the saw blade 40 is attached to the saw control hub 44, the saw blade shank seats in the recess 60. This configuration prevents the saw blade 40 from rotating with respect to the saw control hub 44.

A screw attaches the saw blade 40 to the saw control hub 44 and the saw control handle 42 for rotatably mounting this assembly with respect to the other portions of the handle 20. There is sufficient friction between the saw control hub 44, the saw control handle 42 and handle 20, so that the saw control handle 42 is substantially prevented from rotating without a person manually applying force thereto.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

While various embodiments have been described, it is to be understood that the embodiments described are illustrative only and that the scope of the subject matter is to be accorded a full range of equivalents, many variations and modifications naturally occurring to those of skill in the art from a perusal hereof.

The invention claimed is:

1. A multi-purpose handheld tool comprising:
    a handle having a first end and a second end, wherein the handle has a slot formed therein;
    a hatchet head portion operatively coupled to the first end of the handle;
    a saw blade; and
    a saw blade control mechanism that comprises:
        a saw control handle having a gripping extension extending therefrom in a direction that is away from the handle, wherein the gripping extension comprises a first gripping end and a second gripping end, wherein the first gripping end extends radially with respect to the axis of the saw control handle beyond a perimeter of the saw control handle and wherein the first gripping end indicates a direction of the saw blade with respect to the handle; and a saw control hub attached to the saw blade and the saw control handle and mounted to the handle for rotation about an axis so that rotation of the saw control handle pivots the saw blade and the first gripping end in a same direction such that the first gripping end extends in a direction generally aligned with a direction of the saw blade between a storage configuration and a use configuration.

2. The multi-purpose handheld tool of claim 1, wherein when the saw blade is in the storage configuration, the saw blade is at least partially received within the slot and wherein when the saw blade is in the use configuration, the saw blade extends from the handle.

3. The multi-purpose handheld tool of claim 1, wherein the first gripping end is shaped differently than the second gripping end.

4. The multi-purpose handheld tool of claim 1, wherein at least a portion of an upper surface of the gripping extension has a convex shape.

5. The multi-purpose handheld tool of claim 1, wherein the saw control handle has a mating extension extending therefrom, wherein the saw control hub has a mating recess formed therein that is adapted to receive a portion of the mating extension and wherein at least a portion of the mating extension is shaped similar to the mating recess to prevent the saw control handle from rotating with respect to the saw control hub when the mating extension is extended into the mating recess.

6. The multi-purpose handheld tool of claim 1, wherein the saw blade is detachably attached to the multi-purpose handheld tool.

7. The multi-purpose handheld tool of claim 1, wherein the saw blade is pivotally attached to the handle proximate the second end.

8. A method of fabricating multi-purpose handheld tool comprising:

providing a handle having a first end and a second end;
providing a saw control handle having a gripping extension extending therefrom in a direction that is away from the handle, wherein the saw control handle has a rotational axis and wherein the gripping extension comprises a first gripping end and a second gripping end;

forming the first gripping end so that the first gripping end extends radially with respect to the axis of the saw control hub beyond a perimeter of the saw control handle;

forming a slot in the handle;

operably attaching a hatchet head portion to the first end of the handle;

rotatably mounting a saw blade to the handle by engaging the saw blade with a saw control hub for rotation about an axis between a use configuration and a storage configuration; and attaching the saw control handle to the saw control hub, wherein the first gripping end indicates a direction of the saw blade with respect to the handle and wherein rotation of the saw control handle pivots the saw blade and the first gripping end in a same direction such that the first gripping end extends in a direction generally aligned with a direction of the saw blade between the storage configuration and the use configuration.

9. The method of claim 8, further comprising:

positioning the saw blade in the storage configuration where the saw blade is at least partially received within the slot; and rotating the saw blade to the use configuration where the saw blade extends from the handle.

10. The method of claim 8, further comprising forming the first gripping end that is different than the second gripping end.

11. The method of claim 8, further comprising forming at least a portion of an upper surface of the gripping extension with a convex shape.

12. The method of claim 8, further comprising:

providing a mating extension extending from the saw control handle;

providing a mating recess formed in the saw control hub, wherein at least a portion of the mating extension is shaped complementary to the mating recess; and extending the mating extension into the mating recess to prevent the saw control handle from rotating with respect to the saw control hub.

13. The method of claim 8, further comprising detachably attaching the saw blade to the handle.

14. The method of claim 8, wherein pivotally attaching the saw blade the handle is proximate the second end.

* * * * *